United States Patent
Ma et al.

(10) Patent No.: US 10,246,334 B2
(45) Date of Patent: Apr. 2, 2019

(54) METHOD OF PRODUCING HETEROPHASE GRAPHITE

(71) Applicant: NATIONAL CHUNG SHAN INSTITUTE OF SCIENCE AND TECHNOLOGY, Taoyuan (TW)

(72) Inventors: Dai-Liang Ma, Taoyuan (TW); Cheng-Jung Ko, Taoyuan (TW); Bang-Ying Yu, Taoyuan (TW); Tsao-Chun Peng, Taoyuan (TW)

(73) Assignee: NATIONAL CHUNG SHAN INSTITUTE OF SCIENCE AND TECHNOLOGY (TW)

(*) Notice: Subject to any disclaimer, the term of this patent is extended or adjusted under 35 U.S.C. 154(b) by 164 days.

(21) Appl. No.: 15/434,088

(22) Filed: Feb. 16, 2017

(65) Prior Publication Data

US 2018/0179065 A1  Jun. 28, 2018

(30) Foreign Application Priority Data

Dec. 22, 2016  (TW) .............................. 105142586 A

(51) Int. Cl.
  *C01B 32/21* (2017.01)
  *C01B 32/205* (2017.01)

(52) U.S. Cl.
  CPC ............ *C01B 32/21* (2017.08); *C01B 32/205* (2017.08)

(58) Field of Classification Search
  CPC .. C01B 32/21; C01P 2004/82; C01P 2002/72; C01P 2006/40; C01P 2004/03
  USPC ................................ 423/448, 460, 344–346
  See application file for complete search history.

(56) References Cited

FOREIGN PATENT DOCUMENTS

CN       87103661 A      11/1988
CN       1331048 A       1/2002

OTHER PUBLICATIONS

Emtsev, et al., Towards wafer-size graphene layers by atmospheric pressure graphitization of silicon carbide, Nature Materials 2009; 8: 203-207 (Year: 2009).*

(Continued)

*Primary Examiner* — Daniel McCracken
(74) *Attorney, Agent, or Firm* — Schmeiser, Olsen & Watts, LLP

(57) ABSTRACT

A method of producing a heterophase graphite, including the steps of (A) providing a silicon carbide single-crystal substrate; (B) placing the silicon carbide single-crystal substrate in a graphite crucible and then in a reactor to undergo an air extraction process; and (C) performing a desilicification reaction on the silicon carbide single-crystal substrate in an inert gas atmosphere to obtain 2H graphite and 3R graphite, so as to directly produce lumpy (sheetlike, crushed, particulate, and powderlike) 2H graphite and 3R graphite, and preclude secondary contamination of raw materials which might otherwise occur because of a crushing step, an oxidation step, and an acid rinsing step.

10 Claims, 8 Drawing Sheets

(56) References Cited

OTHER PUBLICATIONS

Charrier, et al., Solid-state decomposition of silicon carbide for growing ultra-thin heteroepitaxial graphite films, J. Appl. Phys. 2002; 92(5): 2479-2484 (Year: 2002).*
De Heer, et al., Large are and structured epitaxial graphene produced by confinement controlled sublimation of silicon carbide, PNAS 2011; 108(41): 16900-16905 (Year: 2011).*
Rollings, et al., Synthesis and characterization of atomically thin graphite films on a silicon carbide substrate, Journal of Physics and Chemistry of Solids 2006; 67: 2172-2177 (Year: 2006).*
Shi, et al., Graphite structure and lithium intercalation, Journal of Power Sources 1997; 68: 291-295 (Year: 1997).*

\* cited by examiner

METHOD OF PRODUCING HETEROPHASE GRAPHITE

CROSS-REFERENCE TO RELATED APPLICATION

This non-provisional application claims priority under 35 U.S.C. § 119(a) on Patent Application No(s). 105142586 filed in Taiwan, R.O.C. on Dec. 22, 2016, the entire contents of which are hereby incorporated by reference.

FIELD OF THE INVENTION

The present invention relates to raw material synthesis methods and, more particularly, to a method of producing a heterophase graphite composed of 2R graphite and 3R graphite.

BACKGROUND OF THE INVENTION

Graphite has a layered crystalline structure and consists of carbon atoms arranged in regularly stacked layers of hexagonal lattices. Given the variations in the arrangement of the carbons atoms in each layer of hexagonal lattices, graphite comes in different forms. For example, hexagonal 2H graphite is characterized in that the second layer of lattices is rotated by 180 degrees in order to be positioned between the identical first and third layers of lattices. Rhombohedral 3R graphite is formed by rotating the second layer of lattices by 120 degrees, rotating the third layer of lattices by 240 degrees, wherein the first and fourth layers of lattices are identical. Regarding the application of the heterophase graphite, 3R graphite is similar to adamas in terms of the arrangement of carbon atoms in lattices; hence, 3R graphite can be easily converted into adamas to facilitate the synthesis of adamas from graphite. By contrast, it is difficult to convert 2H graphite into adamas; as a result, the conversion process must entail changing 2H graphite to 3R graphite, and then changing 3R graphite to adamas. Furthermore, 2H graphite features hexagonal lattices and thus surpasses 3R graphite in structural strength and heat conduction. Therefore, 2H graphite is applicable to substrates which are highly thermally conductive.

A conventional way to purify graphite involves grinding graphite until it becomes a fine powder, treating the powdered graphite with hydrofluoric acid, neutralizing the acid-treated powdered graphite with sodium hydroxide (NaOH), treating it with hydrochloric acid, and finally rinsing it with water. The conventional purification technique is intricate, consumes plenty of reagents, and incurs high costs. For instance, China patent CN1331048 discloses that a conventional method of purifying 3R graphite comprises a crushing step, an acid treatment step, a water rinsing step, a drying step, a grading step, and a packing step, and is characterized in that the acid treatment is a one-shot treatment performed on natural 3R graphite, using a solution of mixture of hydrofluoric acid and hydrochloric acid. China patents CN87103661 discloses separating 3R graphite and 2H graphite by a special solution because of a difference of 0.06~0.08 in relative density between 3R graphite and 2H graphite and using, as a medium, a special solution similar to graphite in relative density to regulate heavy-liquid temperature so that its relative density falls between the relative densities of 2H graphite and 3R graphite and thereby allow 2H graphite to ascend and 3R graphite to descend so as to effectuate separation; but the aforesaid process and subsequent solution treatment are intricate.

Therefore, it is necessary to provide a method of producing heterophase graphite to circumvent the crushing, oxidation, and acid-rinsing steps and thereby directly produce lumpy (sheetlike, crushed, particulate, and powderlike) 2H graphite and 3R graphite with a view to meet both efficiency requirement and green requirement and producing 2H graphite and 3R graphite that meets industrial needs.

SUMMARY OF THE INVENTION

In view of the aforesaid drawbacks of the prior art, it is an objective of the present invention to provide a method of producing heterophase graphite, integrating a silicon carbide single-crystal substrate, a graphite crucible, a synthesis furnace, and a desilicification reaction, so as to obtain 2H graphite and 3R graphite.

In order to achieve the above and other objectives, the present invention provides a method of producing heterophase graphite, comprising the steps of: (A) providing a silicon carbide single-crystal substrate; (B) placing the silicon carbide single-crystal substrate in a graphite crucible and then in a reactor to undergo an air extraction process; and (C) performing a desilicification reaction on the silicon carbide single-crystal substrate in an inert gas atmosphere to obtain 2H graphite and 3R graphite, wherein the graphite is sheetlike, lumpy, particulate, and powderlike.

In step (A), the silicon carbide single-crystal substrate is 10 μm~10000 μm thick and is a silicon carbide wafer, a silicon carbide ingot, a silicon carbide chip, or a silicon carbide block, with a diameter of 2~6 inches. The silicon carbide single-crystal substrate is divided by a hermetic seal material into a reactive monocrystalline crystal surface and a non-desilicified surface. The reactive monocrystalline crystal surface (carbon phase or silicon phase) is adapted to undergo a desilicification reaction. The non-desilicified phase (non-reactive carbon phase or silicon phase of the monocrystalline crystal surface) is hermetically sealed and enclosed by a hermetic seal material so that only the reactive carbon phase or silicon phase of the monocrystalline crystal surface is exposed from the silicon carbide single-crystal substrate to undergo the reaction. The hermetic seal material for the non-desilicified surface comprises one selected from the group consisting of colloidal graphite, graphite film, TaC film, WC film, and metal carbide.

In step (B), the air extraction process entails creating a vacuum in the reaction furnace to remove nitrogen and oxygen therefrom and raising the temperature of the synthesis furnace to 900° C.~1400° C. (but the present invention is not limited thereto). In step (C), the desilicification reaction occurs at a desilicification reaction temperature of 1800° C.~2200° C. (but the present invention is not limited thereto) and a desilicification reaction pressure of 0.001 torr~100 torr (but the present invention is not limited thereto). According to the present invention, the desilicification reaction occurs to the reactive monocrystalline crystal surface of the silicon carbide single-crystal substrate by two mechanisms as follows: the desilicification reaction occurs to the monocrystalline crystal surface of the carbon phase to produce 2H graphite; and the desilicification reaction occurs to the monocrystalline crystal surface of the silicon phase to produce 3R graphite. The 2H graphite and 3R graphite produced according to the present invention are applicable to different fields, respectively. The 2H graphite is applicable to highly thermally conductive substrates, heat-dissipating substrates, graphene precursors, and battery cathodes. The 3R graphite is applicable to synthetic diamonds, battery anodes, graphene, and diamond substrate precursors.

The above summary and the following detailed description and accompanying drawings are intended to further explain the way and measures taken to achieve the predetermined objectives of the present invention and advantages thereof. The other objectives and advantages of the present invention are explained below and illustrated by the accompanying drawings.

DETAILED DESCRIPTION OF THE PREFERRED EMBODIMENTS

The present invention is illustrated hereunder by specific embodiments. By referring to the disclosure herein, persons skilled in the art can easily understand the advantages and effects of the present invention.

Conventional methods of producing 3R graphite and 2H graphite require crushing treatment, acid treatment (hydrofluoric acid and hydrochloric acid), water rinsing, drying, grading, and packing steps. The crushing treatment entails crushing mineral graphite until it becomes graphite powder. The acid treatment entails placing the crushed graphite powder in an acid treatment container, introducing a solution of mixture of hydrofluoric acid (HF) and hydrochloric acid (HCl) (at the ratio of 2.5:0~3) into the container, immersing the graphite powder in the solution of mixture of HF and HCl in the container for 20~30 hours, stirring the graphite powder-containing solution of mixture of HF and HCl while heating it to 80° C., and performing acid treatment on the graphite powder to remove silicate metal oxide impurity from the graphite. The aforesaid process is expressed by the chemical equation below.

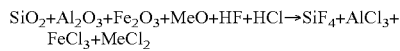

After undergoing acid treatment, the purified 3R graphite mineral powder is rinsed with water and then baked, dried at a low temperature, for example, 80° C.~150° C., for 3~5 hours. The baked, dried graphite powder has water content of less than 0.5% and is sieved with a standard sieve so as to be graded, thereby meeting the requirement for the synthesis of high-quality microcrystalline, ultramicrocrystalline adamas. Therefore, the conventional separation and purification processes are not only intricate but also require subsequent solvent treatment.

Figure 1:
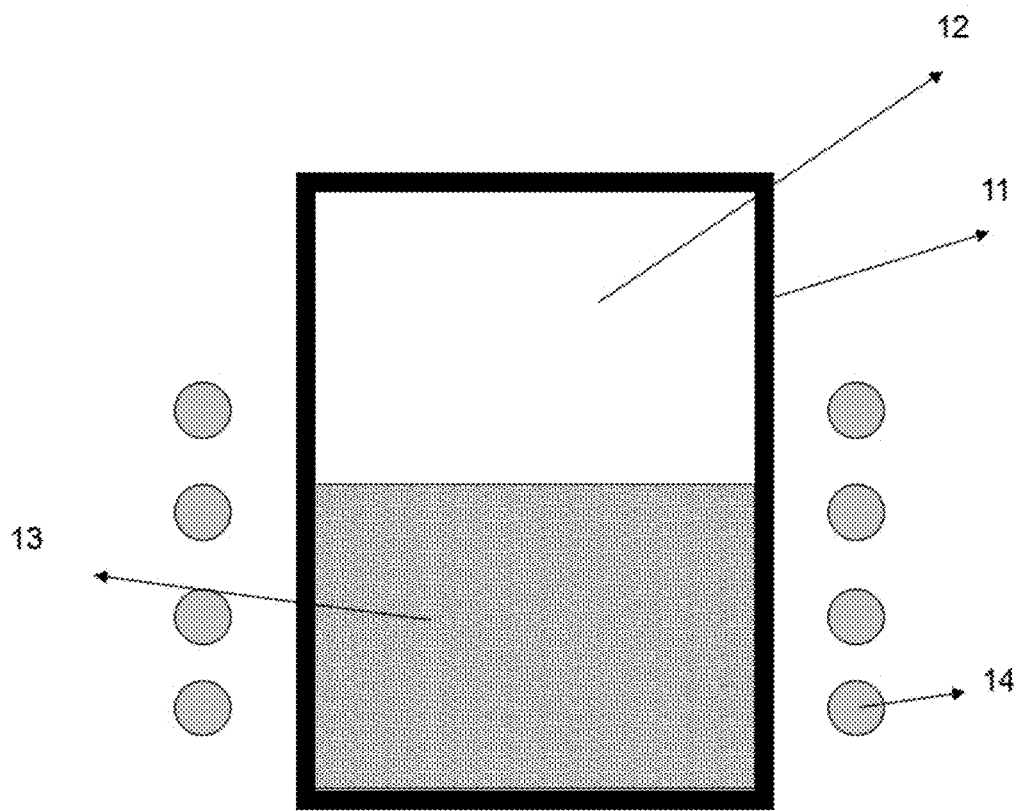
FIG. 1 is a schematic view of an apparatus for producing a heterophase graphite according to the present invention.

The method of the present invention facilitates a process which dispenses with the need to use powder as a synthetic raw material, so as to achieve two advantages: powder delivery risks are eliminated; and heterophase graphite is produced by a desilicification reaction directly, as no products of the desilicification reaction have to undergo crushing, oxidation, and acid-rinsing steps, so as to not only reduce the pollution arising from the back-end process, but also preclude the hazards associated with dust storms caused by the crushing process. According to the present invention, the silicon carbide single-crystal substrate undergoes a desilicification reaction at a high-temperature, low-pressure environment. The desilicification reaction takes place on different crystal surfaces of the silicon carbide. The other non-reactive surface is hermetically sealed by colloidal graphite, graphite film, or metal carbide film (TaC, WC) so that silicon vapor undergoes desilicification in the direction of one crystal surface (carbon phase or silicon phase). Upon completion of the desilicification, a 2H graphite substrate and a 3R graphite substrate are formed on the carbon phase and the silicon phase, respectively. A single graphite substrate is formed without the need to separate or purify 2H graphite and 3R graphite; hence, not only are the processes of separating and purifying 2H graphite and 3R graphite lessened, but it is also unnecessary to use a large amount of solvent in rinsing. Referring to FIG. 1, it is a schematic view of an apparatus for producing a heterophase graphite according to the present invention. As shown in the diagram, the reactive apparatus comprises a graphite crucible 11. The graphite crucible 11 comprises a cover and a crucible body. The crucible body has therein a growth chamber 12, a material source 13, and a heat source 14. The cover is disposed on the growth chamber 12. The material source 13 is disposed under the growth chamber 12. The graphite crucible 11 is placed in a synthesis furnace 15 and positioned at a relative heat end of a heat field.

Figure 2:
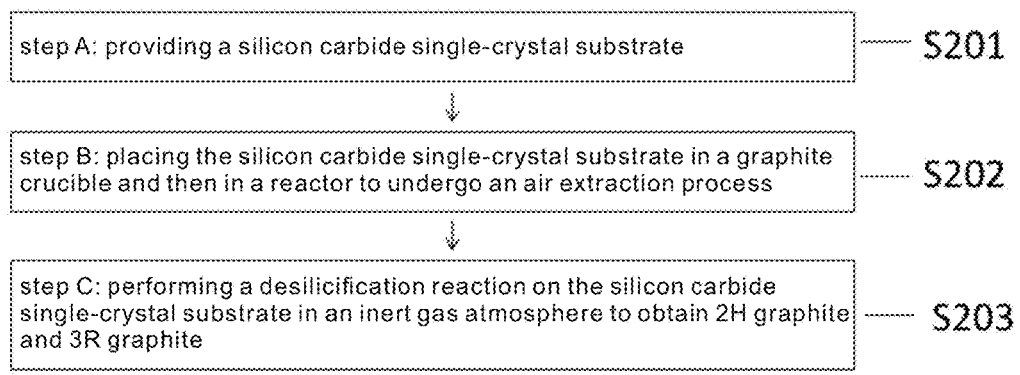
FIG. 2 is a flowchart of a method of producing heterophase graphite according to the present invention.

Referring to FIG. 2, it is a flowchart of a method of producing heterophase graphite according to the present invention. As shown in the diagram, the present invention provides a method of producing a heterophase graphite, comprising the steps of: (A) providing a silicon carbide single-crystal substrate S201 (in the embodiment, the silicon carbide single-crystal substrate is 10 μm~10000 μm thick and is a silicon carbide wafer, a silicon carbide ingot, a silicon carbide chip, or a silicon carbide block, with a diameter of 2~6 inches, the silicon carbide single-crystal substrate is divided by a hermetic seal material into a reactive monocrystalline crystal surface and a non-desilicified surface, the reactive monocrystalline crystal surface (carbon phase or silicon phase) is adapted to undergo a desilicification reaction, whereas the non-desilicified surface (non-reactive carbon phase or silicon phase of the monocrystalline crystal surface) is hermetically sealed and enclosed by a hermetic seal material so that only the reactive carbon phase or silicon phase of the monocrystalline crystal surface is exposed from the silicon carbide single-crystal substrate to undergo the reaction, wherein the hermetic seal material for the non-desilicified surface comprises one selected from the group consisting of colloidal graphite, graphite film, TaC film, WC film, and metal carbide; (B) placing the silicon carbide single-crystal substrate in a graphite crucible and then in a reactor to undergo an air extraction process S202, wherein the synthesis furnace has therein a graphite crucible, and the silicon carbide single-crystal substrate is disposed in the graphite crucible; and (C)

performing a desilicification reaction on the silicon carbide single-crystal substrate in an inert gas atmosphere to obtain 2H graphite and 3R graphite S203.

Embodiment

In this embodiment, a silicon carbide single-crystal chip (10~10000 μm thick) with a diameter of 2 inches is placed at any point inside a graphite crucible so that the silicon carbide single-crystal chip exposes only a crystal surface which needs desilicification, whereas the other crystal surfaces which do not need desilicification are hermetically sealed by colloidal graphite, graphite film, or metal carbide film (TaC, WC). Afterward, the graphite crucible is placed in a reactor so that the silicon carbide single-crystal chip undergoes an air extraction process. The air extraction process entails creating a vacuum in the reactor to remove nitrogen and oxygen from the reactor and material source and raising the temperature of the reactor to 900° C.~1400° C. Then, a high-purity inert gas (argon gas, helium gas, or a mixture of argon gas and hydrogen gas, each with a purity of at least 99.999%) is introduced into the reactor. The aforesaid temperature of the reactor is maintained for 1-24 hours. Afterward, the reactor is heated to a reaction temperature 1800° C.~2200° C. and depressurized to a reaction pressure 0.001 torr~100 torr. The desilicification reaction takes 4~24 hours to complete. Upon completion of the desilicification reaction, the temperature of the reactor is lowered to the room temperature. In this embodiment, since the carbon phase and the silicon phase differ in polarity, it is feasible to produce a 2H graphite substrate and a 3R graphite substrate.

This embodiment is effective in producing 2H graphite and 3R graphite without any separation or purification process. Silicon carbide chips or silicon carbide wafers undergo a desilicification reaction at high temperature and low pressure to effectuate synthesis of graphite. Due to the difference in polarity between the carbon phase and the silicon phase of the silicon carbide, a 2H graphite substrate and a 3R graphite substrate are produced by a desilicification reaction at high temperature and low pressure. High-purity 2H graphite and 3R graphite are produced without any separation or purification process. Furthermore, the desilicification of the silicon carbide is speeded up by controlling the reaction pressure and temperature.

Figure 3:
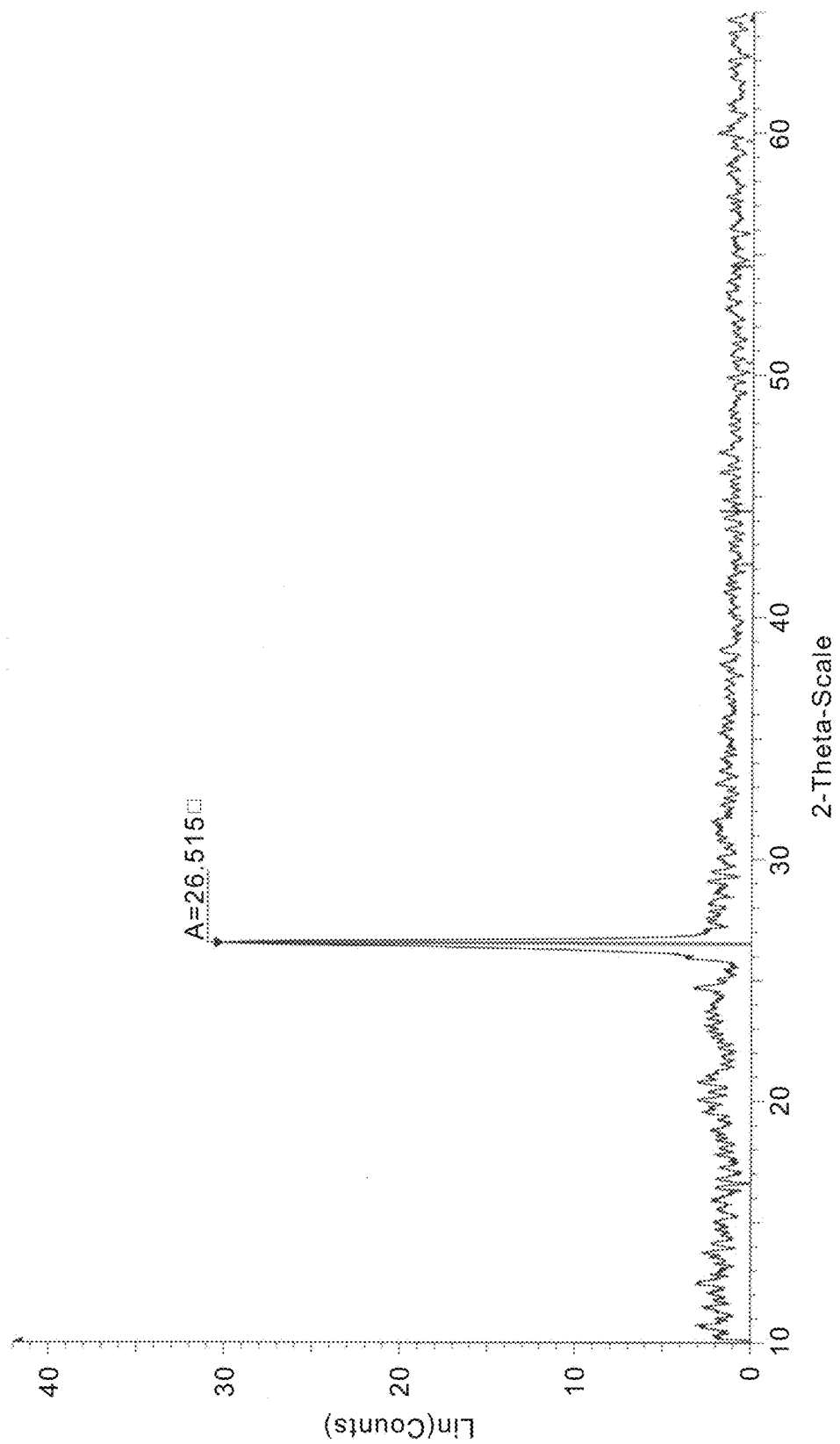
FIG. 3 is an XRD graph of the carbon phase of a silicon carbide which has undergone a desilicification reaction according to the present invention.
Figure 4:
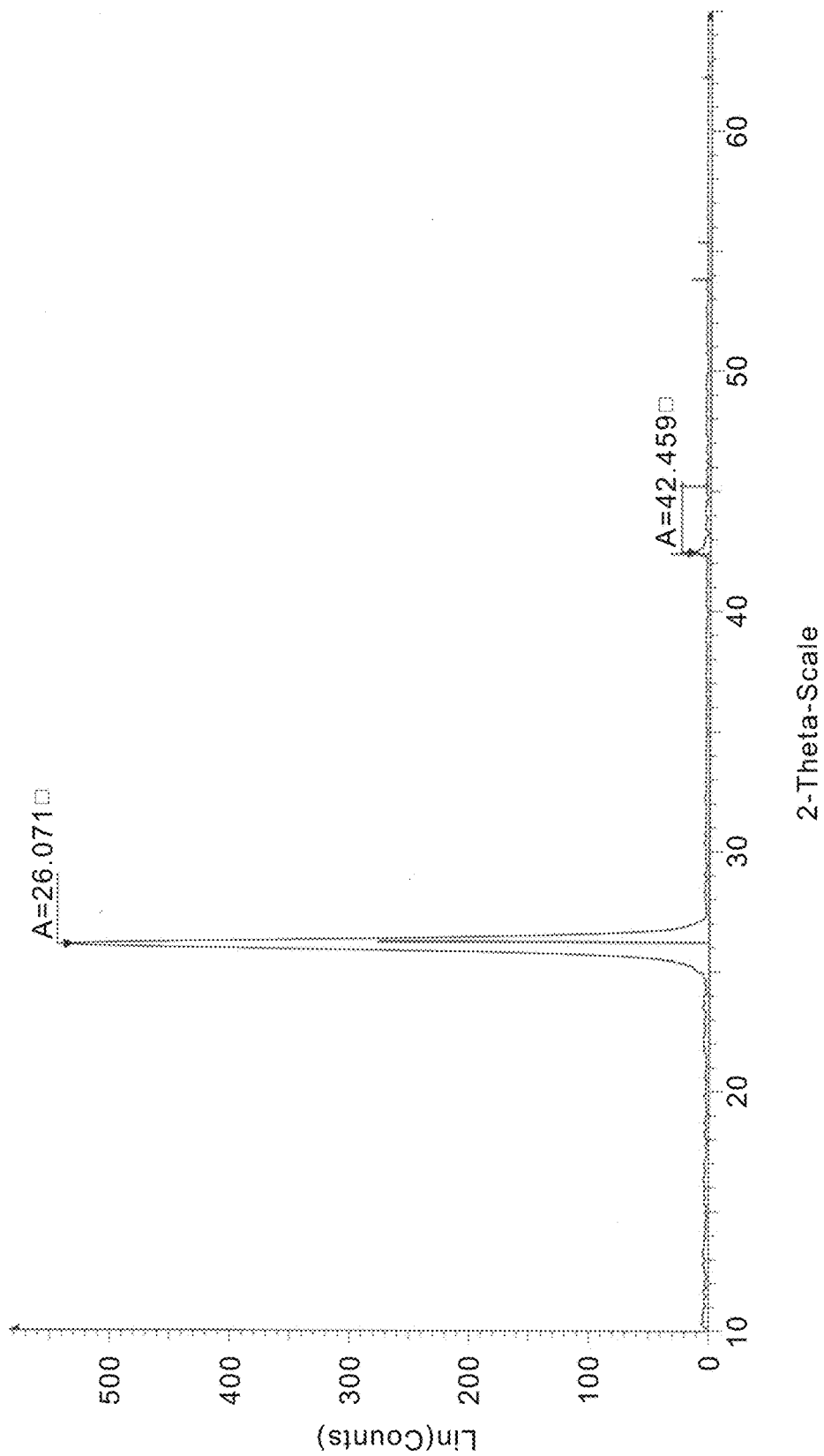
FIG. 4 is an XRD graph of the silicon phase of a silicon carbide which has undergone a desilicification reaction according to the present invention.
Figure 5:
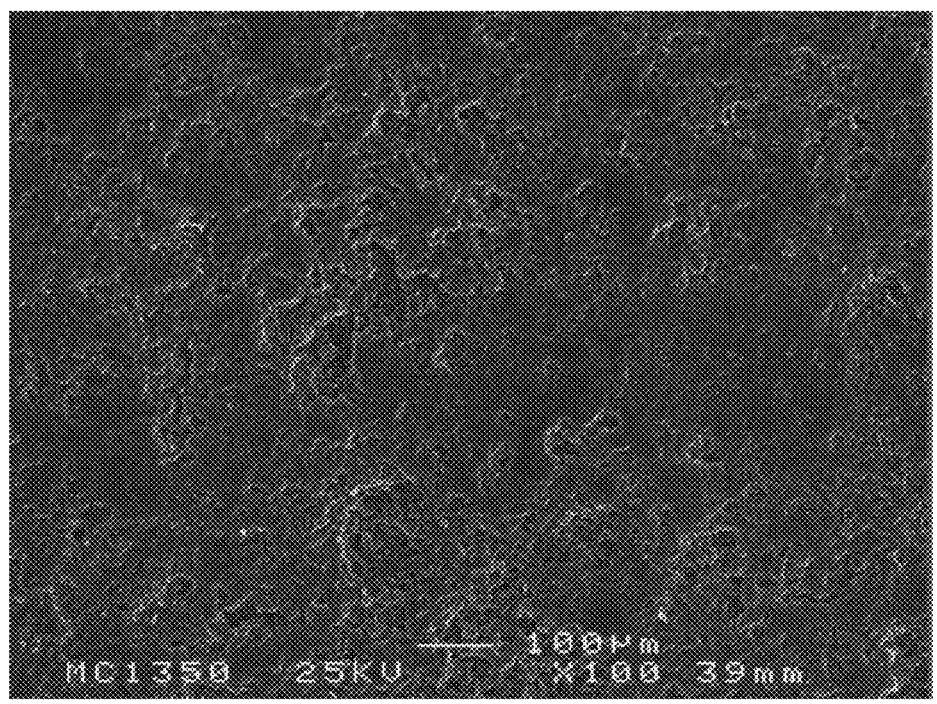
FIG. 5 is an SEM image of the carbon phase of a silicon carbide which has undergone a desilicification reaction according to the present invention.
Figure 6:
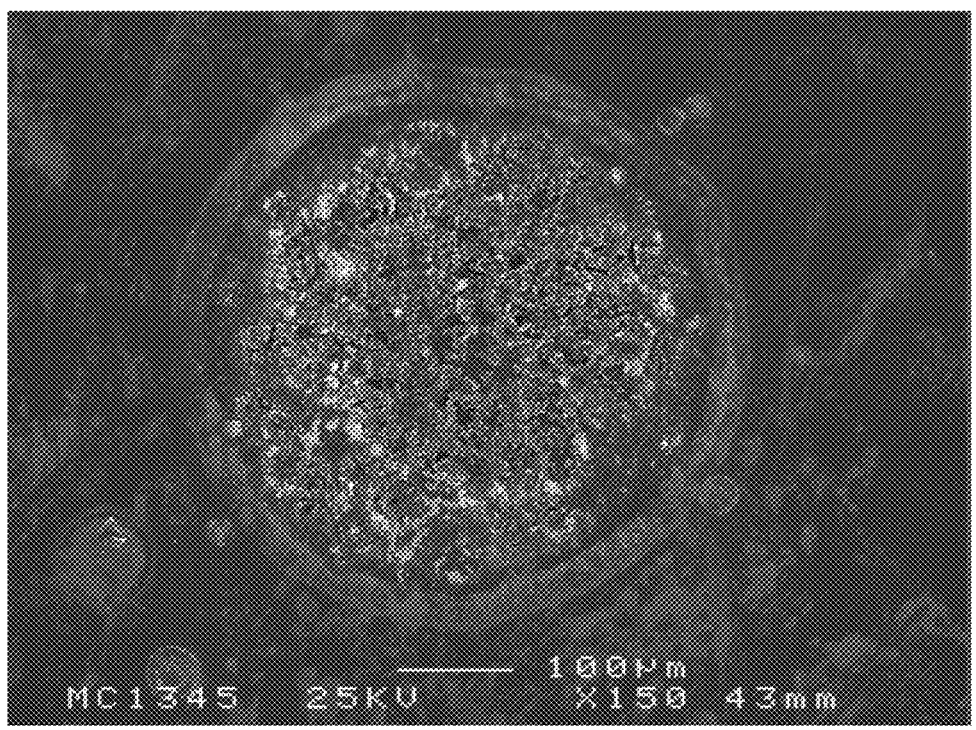
FIG. 6 is an SEM image of the silicon phase of a silicon carbide which has undergone a desilicification reaction according to the present invention.
Figure 7:
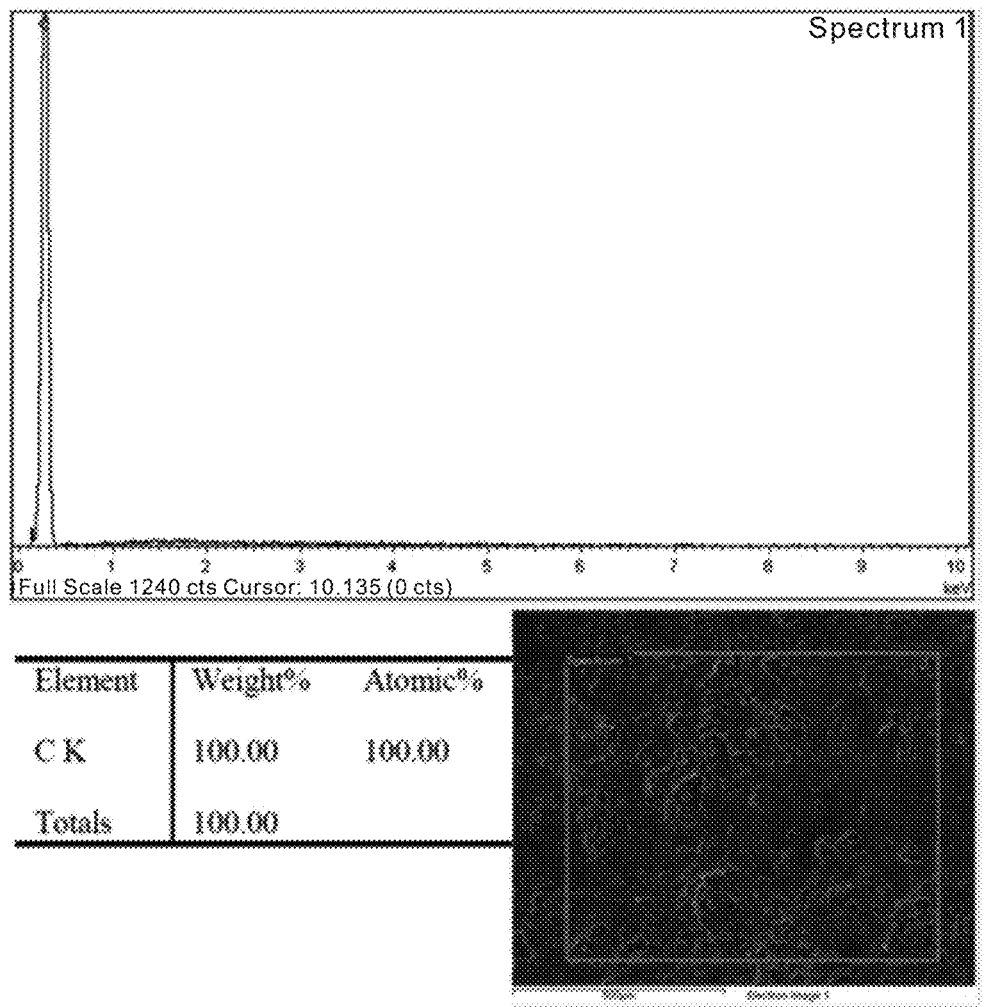
FIG. 7 is a diagram of EDS analysis of the carbon phase of a silicon carbide which has undergone a desilicification reaction according to the present invention.
Figure 8:
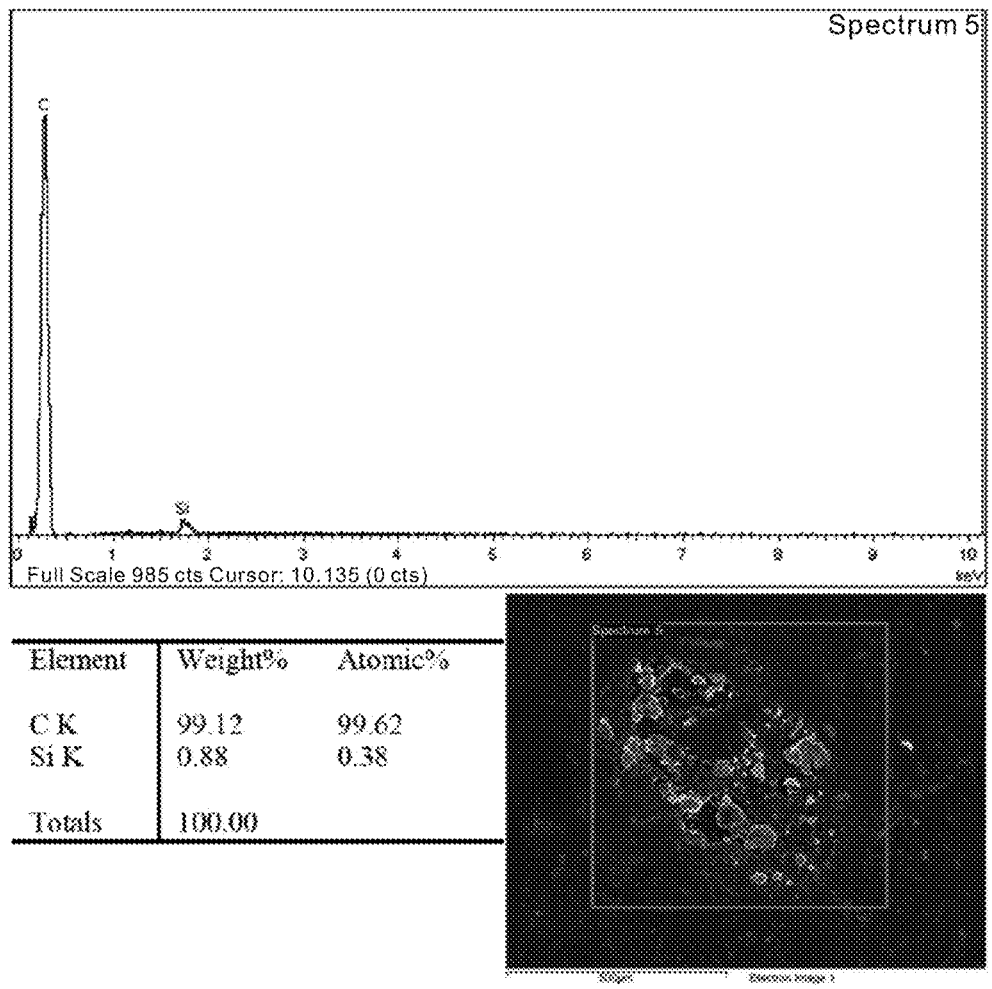
FIG. 8 is a diagram of EDS analysis of the silicon phase of a silicon carbide which has undergone a desilicification reaction according to the present invention.

Referring to FIG. 3, it is an XRD graph of the carbon phase of a silicon carbide which has undergone a desilicification reaction according to the present invention. Referring to FIG. 4, it is an XRD graph of the silicon phase of a silicon carbide which has undergone a desilicification reaction according to the present invention. Referring to FIG. 5, it is an SEM image of the carbon phase of a silicon carbide which has undergone a desilicification reaction according to the present invention. Referring to FIG. 6, it is an SEM image of the silicon phase of a silicon carbide which has undergone a desilicification reaction according to the present invention. Referring to FIG. 7, it is a diagram of EDS analysis of the carbon phase of a silicon carbide which has undergone a desilicification reaction according to the present invention. Referring to FIG. 8, it is a diagram of EDS analysis of the silicon phase of a silicon carbide which has undergone a desilicification reaction according to the present invention. The result of the XRD analysis reveals that the desilicification reaction occurs to the carbon phase of the silicon carbide to produce 2H graphite (as shown in FIG. 3) and occurs to the silicon phase of the silicon carbide to produce 3R graphite (as shown in FIG. 4). Referring to FIG. 5 and FIG. 6, the result of the SEM analysis reveals that the graphite produced by desilicification is the same regardless of whether the desilicification occurs to the carbon phase or the silicon phase (in both scenarios, Si atoms are removed so that holes are formed, and the diameters of the holes vary with temperature and pressure.) The result of the EDS analysis reveals: even though desilicification occurs at the same high temperature, the carbon phase is not associated with any Si signal (as shown in FIG. 7), whereas a trace of Si element is found on the silicon phase (as shown in FIG. 8), because of the difference in polarity between the carbon surface and the silicon surface of the silicon carbide substrate, and in consequence the carbon phase and the silicon phase of the silicon carbide substrate differ in energy requirement for carrying out a desilicification reaction. Therefore, the production of 3R graphite by carrying out the desilicification reaction to the silicon phase requires a higher reaction temperature and a longer reaction duration than the production of 2H graphite by carrying out the desilicification reaction to the carbon phase, in order to obtain a completely desilicified 3R graphite substrate.

According to the embodiments of the present invention, due to the difference in polarity between a carbon phase and a silicon phase of a silicon carbide chip, a desilicification reaction occurs to the silicon carbide chip at high temperature and lower pressure in a manner to remove silicon vapor from the silicon carbide chip and thus form heterophase graphite substrates, thereby producing 2H graphite and 3R graphite without any separation or purification process inclusive of a crushing step and an acid rinsing step. Unlike the prior art, the present invention provides a simple method of producing 2H graphite and 3R graphite which are of a higher purity and can directly form a single phase substrate. In addition, the present invention advantageously features a reduction in the number of required processes and reduction of contamination.

Although the present invention is disclosed above by preferred embodiments, the preferred embodiments are not restrictive of the present invention. Changes and modifications made by persons skilled in the art to the preferred embodiments without departing from the spirit and scope of the present invention must be deemed falling within the scope of the present invention. Accordingly, the legal protection for the present invention should be defined by the appended claims.

What is claimed is:

1. A method of producing a heterophase graphite, comprising the steps of:
   (A) providing a silicon carbide single-crystal substrate;
   (B) placing the silicon carbide single-crystal substrate in a graphite crucible and then in a reactor to undergo an air extraction process; and
   (C) performing a desilicification reaction on the silicon carbide single-crystal substrate in an inert gas atmosphere to obtain 2H graphite and 3R graphite;
      wherein the air extraction process entails creating a vacuum in the synthesis furnace to remove nitrogen and oxygen therefrom and raising the temperature of the synthesis furnace to 900° C.~1400° C.

2. The method of claim 1, wherein the silicon carbide single-crystal substrate is 10 μm~10000 μm thick and is one of a silicon carbide wafer, a silicon carbide ingot, a silicon carbide chip, and a silicon carbide block.

3. The method of claim 1, wherein the silicon carbide single-crystal substrate is divided by a hermetic seal material into a reactive monocrystalline crystal surface and a non-desilicified surface.

4. The method of claim 1, wherein the desilicification reaction occurs to the reactive monocrystalline crystal surface of the carbon phase to produce 2H graphite.

5. The method of claim 1, wherein the desilicification reaction occurs to the reactive monocrystalline crystal surface of the silicon phase to produce 3R graphite.

6. The method of claim 3, wherein the hermetic seal material comprises one selected from the group consisting of colloidal graphite, graphite film, TaC film, WC film, and metal carbide.

7. The method of claim 1, wherein the desilicification reaction occurs at a reaction temperature of 1800° C.~2200° C. and a reaction pressure of 0.001 torr~100 torr.

8. The method of claim 1, wherein the silicon carbide single-crystal substrate has a diameter of 2~6 inches.

9. The method of claim 5, wherein the 3R graphite is applicable to diamond substrate precursors.

10. A method of producing a heterophase graphite, comprising the steps of:
    (A) providing a silicon carbide single-crystal substrate;
    (B) placing the silicon carbide single-crystal substrate in a graphite crucible and then in a reactor to undergo an air extraction process; and
    (C) performing a desilicification reaction on the silicon carbide single-crystal substrate in an inert gas atmosphere to obtain 2H graphite and 3R graphite;
        wherein the silicon carbide single-crystal substrate is divided by a hermetic seal material into a reactive monocrystalline crystal surface and a non-desilicified surface.

* * * * *